United States Patent
Astier (10) Patent No.: US 9,902,122 B2
(45) Date of Patent: Feb. 27, 2018

(54) SUPPORT FOR ASSEMBLING A GREEN TYRE BLANK EQUIPPED WITH MOVABLE ELEMENTS

(75) Inventor: Cédric Astier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 623 days.

(21) Appl. No.: 13/995,677

(22) PCT Filed: Dec. 16, 2011

(86) PCT No.: PCT/FR2011/053015
§ 371 (c)(1),
(2), (4) Date: Aug. 29, 2013

(87) PCT Pub. No.: WO2012/085402
PCT Pub. Date: Jun. 28, 2012

(65) Prior Publication Data
US 2013/0327482 A1    Dec. 12, 2013

(30) Foreign Application Priority Data
Dec. 20, 2010    (FR) .................................... 10 60826

(51) Int. Cl.
*B29D 30/26*    (2006.01)
*B29D 30/24*    (2006.01)

(52) U.S. Cl.
CPC .......... *B29D 30/26* (2013.01); *B29D 30/242* (2013.01); *B29D 2030/2657* (2013.01)

(58) Field of Classification Search
CPC ...... B29D 30/12; B29D 30/26; B29D 30/242; B29D 2030/265; B29D 2030/2657

USPC ...... 156/414–416, 421, 421.8; 152/190, 221, 152/222
See application file for complete search history.

(56) References Cited

U.S. PATENT DOCUMENTS

| | | | |
|---|---|---|---|
| 1,267,544 A * | 5/1918 | Haubner | B60C 11/1612 152/208 |
| 2,685,903 A * | 8/1954 | Lutey | B60C 27/08 152/222 |
| 3,654,025 A | 4/1972 | Winzer et al. | 156/415 |
| 3,822,165 A * | 7/1974 | Habert | B29D 30/36 156/415 |

(Continued)

FOREIGN PATENT DOCUMENTS

| | | |
|---|---|---|
| CN | 1649719 A | 8/2005 |
| CN | 1705555 A | 12/2005 |

(Continued)

OTHER PUBLICATIONS

Written Opinion from Internat'l Appl'n No. PCT/FR2011/053015.
(Continued)

*Primary Examiner* — Geoffrey L Knable
(74) *Attorney, Agent, or Firm* — Fitzpatrick, Cella, Harper & Scinto (57) ABSTRACT

A support for assembling a green tire includes a baseplate with symmetry of revolution and members fixed to the baseplate. Each of the members includes: external elements mounted to be movable relative to one another; and a flexible strip attached to the elements of the member, such that the elements of the member are attached to one another via the flexible strip.

13 Claims, 6 Drawing Sheets

(56) References Cited

U.S. PATENT DOCUMENTS

| | | | |
|---|---|---|---|
| 3,971,694 A | 7/1976 | Gazuit | 156/415 |
| 4,346,748 A * | 8/1982 | Bagoy | B60C 27/16 |
| | | | 152/179 |
| 4,480,670 A * | 11/1984 | Payne | B60C 11/02 |
| | | | 152/169 |
| 4,673,457 A | 6/1987 | Goodfellow | 156/415 |
| 5,453,012 A | 9/1995 | Hudecek | 434/114 |
| 6,827,119 B2 | 12/2004 | Weaver et al. | 156/415 |
| 2002/0141823 A1 | 10/2002 | Baker et al. | 404/102 |
| 2005/0115661 A1 | 6/2005 | Zemla et al. | 156/132 |
| 2005/0244528 A1 | 11/2005 | Slots et al. | 425/35 |
| 2007/0095481 A1 | 5/2007 | Graaf et al. | 156/414 |
| 2009/0289143 A1 | 11/2009 | Tanaka et al. | 242/581 |
| 2010/0101732 A1 * | 4/2010 | Howley | B29D 30/242 |
| | | | 156/414 |
| 2011/0315323 A1 | 12/2011 | Lipsa | 156/414 |

FOREIGN PATENT DOCUMENTS

| | | |
|---|---|---|
| DE | 1234015 A | 2/1967 |
| FR | 2 939 711 A1 | 6/2010 |
| JP | 61-197207 A | 9/1986 |
| JP | 2007-136935 A | 6/2007 |
| JP | 2007-185888 A | 7/2007 |

OTHER PUBLICATIONS

Chinese Office Action (with English translation), dated Jul. 17, 2015.
C. Astier, U.S. Appl. No. 13/995,664, filed Dec. 16, 2011.

* cited by examiner

SUPPORT FOR ASSEMBLING A GREEN TYRE BLANK EQUIPPED WITH MOVABLE ELEMENTS

FIELD OF THE INVENTION

The invention relates to the building of tyres for wheels and in particular to the assembly of a green tyre blank.

BACKGROUND

Application FR-2 939 711 in the name of the applicant company discloses a support for assembling a green tyre blank. The support comprises a baseplate of cylindrical overall shape which on its circumference bears mutually identical shaping members. Each member comprises a series of external elements mounted with the ability to slide independently of one another with respect to a base of the member in a direction radial to the axis of the baseplate. The circumferential external faces of the elements form a support surface on which to assemble the components used to build the green tyre blank. The position of each element with respect to the base is defined by slipping into the member a cam against which the elements press while occupying the required position. The cam has a curvature identical to the curvature that is to be imparted to the surface supporting the green tyre blank. If the shape of this surface is to be changed, for example by accentuating or reducing the curvature, each cam is replaced with a cam that has the required shape. This tyre-building support is therefore a variable-geometry support and can be used by itself to assemble different types of green tyre blank intended for the manufacture of different types of tyre.

However, improvements to this support are still being sought. This is because the abovementioned way of mounting the mobile elements gives the curved bearing surface a stepped profile with corner edges that protrude slightly as seen in a plane radial to the support. Now, it is on this profile that the plies of raw rubber are directly laid, these plies being relatively fragile and therefore carrying the risk of becoming damaged.

SUMMARY

It is one object of the invention to improve the geometric definition of the bearing surface offered by the support.

To that end, the invention provides a support for assembling a green tyre blank which comprises a baseplate with symmetry of revolution and members fixed to the baseplate and each comprising:

external elements mounted with the ability to move relative to one another, and a flexible strip by means of which the elements of the member are attached to one another.

Thus, the strip obviates the need to guide the elements in sliding with respect to the base as was required in the aforementioned document. Attached by the strip, the elements can orientate themselves relative to one another in such a way as to make their external faces locally parallel to one another and thereby eliminate the stepped effect. The support therefore achieves a bearing surface for building the green tyre blank which is smooth and free of protruding corner edges and therefore does not adversely affect the raw rubber when the elements that form the green tyre blank are being laid.

Advantageously, each member comprises a base and the elements are attached to the base by the strip.

For preference, the strip is rigidly fixed to the base only by a portion of its length.

Thus, an isostatic attachment of the strip to the base is achieved that avoids stresses appearing within the member and encourages correct positioning of the elements relative to one another.

Advantageously, the portion is situated at equal distances from two longitudinal ends of the strip.

For preference, the strip is elastically flexible.

Advantageously, the strip is non-extensile.

This then prevents the elements from moving too far apart at the bearing surface and thus creating large voids therein.

For preference, the strip is made of metal, for example of steel.

Provision may be made for the strip to extend at a distance from an internal face of each element.

For example, in each element, the strip is interposed, in a direction radial to a main axis of the support, between two pieces of the element.

Advantageously, at least one of the pieces has, facing the strip, a face configured to allow the element some degree of travel with respect to the strip about an axis locally parallel to the strip and perpendicular to the longitudinal direction of the strip.

This then encourages spontaneous orientation of the element about this axis, and this makes a further contribution towards smoothing the external surface of the support in order to reduce the stepped effect.

For preference, for each element, the strip has an orifice through which one piece of the element passes.

Advantageously, each member comprises, for each element, at least one return member that returns the element towards a base of the member.

This member allows the element to be kept against a component such as a cam that defines the position of the elements with respect to the base.

For preference, the return member is mounted with the ability to rotate with respect to at least one out of the element and the base about an axis perpendicular to a main axis of the support.

Thus, attachment of each element to the base via the return member does not impair the freedom of the element to orientate itself with respect to the elements next to it in order to smooth as far as possible the external surface defined by the elements.

For preference, the return member is mounted with the ability to rotate with respect to the element and to the base about axes that are perpendicular to a main axis of the support.

Thus, this arrangement stabilizes the shape element associated with the member. It limits the risk of the element tipping, under certain stress loading conditions, under the effect of the return member or in the absence of other stress loadings.

Advantageously, each return member comprises a non elastic telescopic skeleton.

For preference, the support comprises means able to set the baseplate in rotation at a speed lower than a predetermined maximum speed, the return member or members associated with each element being designed to return the element when the support is rotating at the maximum speed.

Provision may also be made for each member to comprise at least one cam able to occupy any one of at least two positions which are the image of one another through rotation, in which positions the cam defines element positions with respect to a base of the member and which are such that, in the case of at least some of the elements, the element positions associated with the respective positions of the cam differ from one another.

Thus the same cam can be used to impart at least two different positions to the elements of the member. It is therefore possible, with just one set of cams, to impart at least two different shapes to the external surface of the support. This then simplifies the control and handling of all of the cams.

The invention also provides a member for assembling a green tyre blank which comprises:

means of attachment to a baseplate, external elements mounted with the ability to move relative to one another, and a flexible strip by means of which the elements are attached to one another.

BRIEF DESCRIPTION OF THE DRAWINGS

Further features and advantages of the invention will become more fully apparent from the following description of a number of embodiments which are given by way of nonlimiting examples with reference to the attached drawings in which.

DETAILED DESCRIPTION OF THE INVENTION

In what follows, two embodiments of a support used for building a green tyre blank for a wheel will be described. This wheel may, depending on choice, be the wheel of a passenger vehicle, a light vehicle, a utility vehicle, a heavy goods vehicle or even a wheel for a piece of construction plant. A first embodiment of the support 2 will be described with reference to FIGS. 1 to 24.

The support comprises a baseplate 4 of annular overall shape exhibiting symmetry of revolution about an axis 6 which in this instance is horizontal. The baseplate 4 is of a known type and will not be described in further detail here. In all of what follows, the radial direction is considered, unless otherwise indicated, with reference to the axis 6.

The support 2 comprises shaping members 8, in this instance identical to one another and fixed to an external face of the baseplate 4. Each member 8 has a rectilinear elongate overall shape parallel to the axis 6. The members 8 are arranged with their longitudinal ends coinciding and are uniformly distributed about the axis 6.

One of the members 8 will now be described. The member comprises a base 10 depicted particularly in FIG. 6. The base has an elongate rectilinear overall shape and constitutes a rigid assembly. The member 8 is rigidly fixed to the baseplate by its base 10 and by conventional fixing means which are not described here.

The member 8 comprises a series of external elements 12 extending on an opposite side of the base to the baseplate 4. The elements 12 in this particular instance are all identical to one another within the member 8. The elements 12 follow on from one another along the base being aligned parallel to the axis 6, evenly spaced in the series and with their end edges coinciding.

Each element 12 has a plane of symmetry perpendicular to the axis 6 when the elements are forming a cylindrical bearing surface as will be seen later on. Each element 12 has an external face or top 14 which constitutes the zone of the member 8 that is furthest from the axis 6. The face 14 is curved slightly in a radial plane and in a plane perpendicular to the axis 6. When viewed from above, the top 14 has a shape which, in this particular instance, is rectangular, the length of the rectangle corresponding to the circumferential direction of the baseplate 4.

Each element 12 is extended on one side of the member with two teeth 16 and, on the opposite side, with just one tooth 18. On the first side, the two teeth 16 are spaced apart in the direction of the axis 6 and respectively extend the front and rear long faces of the element. On the other side, the tooth 18 extends at a distance from these two faces. The three teeth also extend the top 14.

Figure 1:
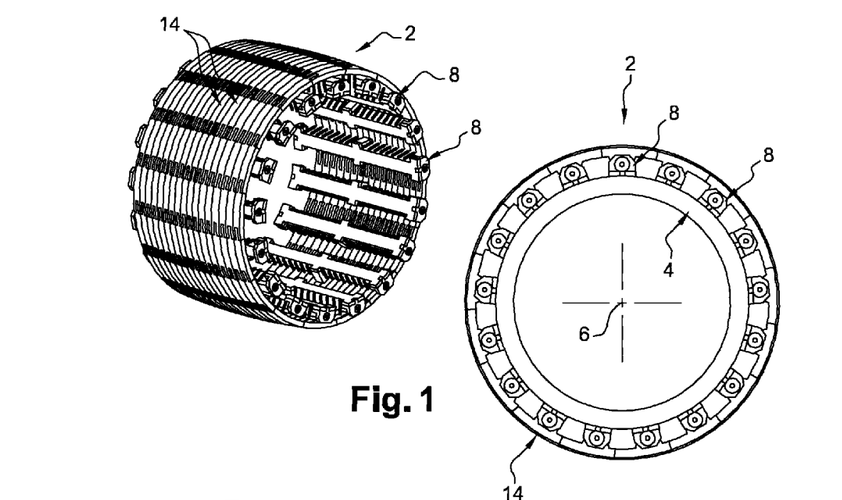
FIG. 1 shows perspective and elevation views of a support according to a first embodiment of the invention defining a bearing surface.
Figure 2:
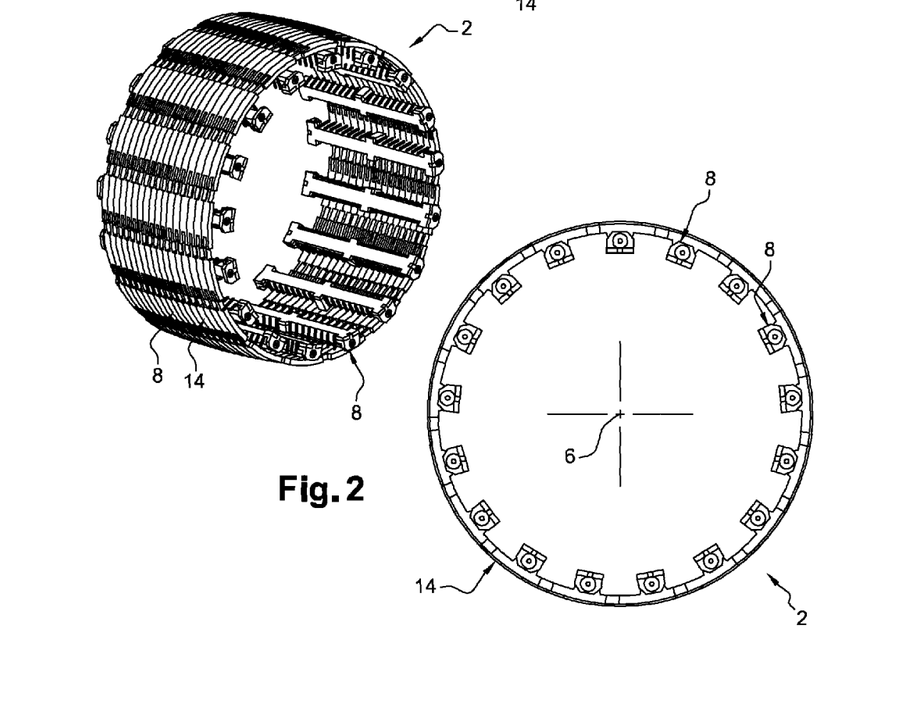
FIG. 2 shows views of the support which are similar to those of FIG. 1 and in which the support defines a different bearing surface.
Figure 3:
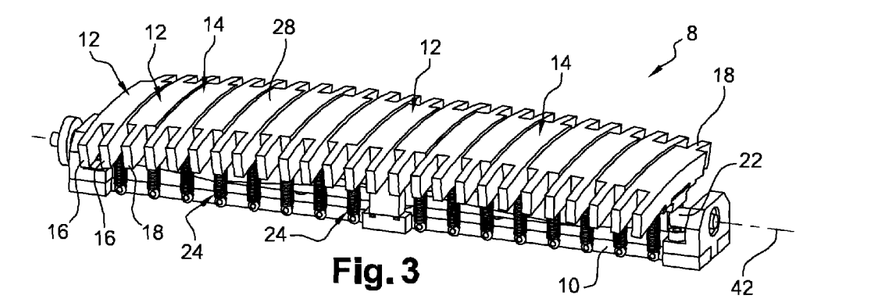
FIGS. 3 to 6 are four perspective views of one of the members of the support of FIG. 1 respectively showing the complete member, the member with a number of elements removed, the member with most of the elements removed, and the base of the member alone.
Figure 4:
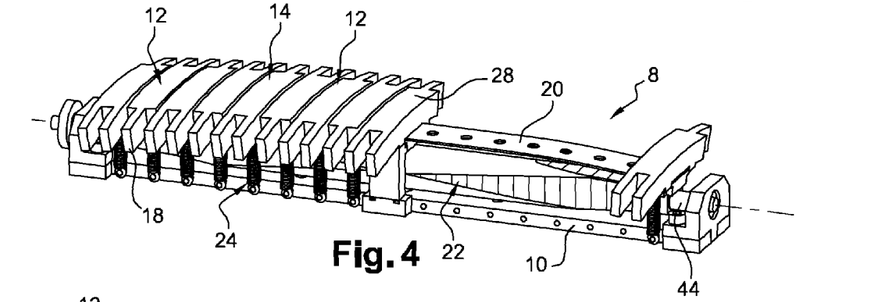
Figure 5:
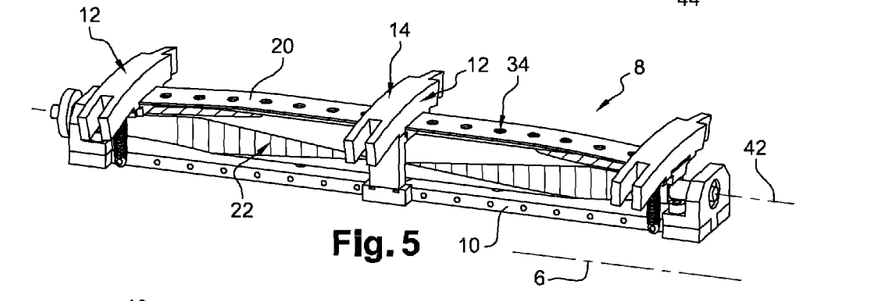
Figure 6:
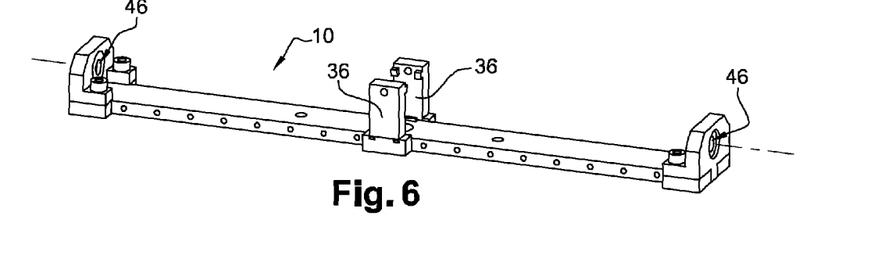

The elements 12 are arranged in such a way that, on each side of the member, each single tooth 18 is interposed between two pairs of teeth 16 as illustrated in FIG. 3. The teeth 16 and 18 are identical and evenly distributed in the series along each side of the member.

Because of the asymmetry of each member 8 with reference to a radial median longitudinal plane, the teeth situated on one side of the member are able to sit between the teeth of the next member 8 in the series along the circumference of the support 2. Thus, the teeth of the successive members interpenetrate. In that way, despite the discontinuity of the bases 10 along the circumference of the baseplate 4, the members 8 form a bearing surface that is continuous along the entire circumference of the baseplate. In particular, if this surface is followed from one of its axial end edges to the other in a plane radial to the axis 6, whatever the position of this plane, one or two of the members 8 always provide support.

What is more, this property is maintained if the baseplate 4 is arranged in such a way as to allow the distance of each member 8 from the axis 6 to be varied. It is such a case that has been illustrated in FIGS. 1 and 2 which respectively show the baseplate in the retracted position and in the extended position. Baseplates having this type of feature are known per se so no further details will be given here. In the retracted position, in FIG. 1, the teeth 16 and 18 interpenetrate closely over most of the length of the teeth as measured in the circumferential direction. In the extended position of FIG. 2, it is only the tips of the teeth that interpenetrate.

In each member 8, the elements 12 are fixed to the base 10 while being connected to one another by a strip or foil 20. A cam 22 is interposed in the direction radial to the axis 6 between the base 10 on the one hand and the elements 12 on the other, in the knowledge that these elements are returned towards the base by return members 24.

There is only one strip 20 for each one member 8, specific to that member and common to all the elements 12 thereof. It is of flat elongate shape and rectangular when viewed in plan. This is a flexible strip, in this instance an elastically flexible strip, which is non-extensile which means that its length cannot be increased by stretching the strip. The strip is made for example of metal, in this instance steel. The strip 20 extends along the base 10, distant from the latter and parallel thereto in a direction parallel to the axis 6.

Each element 12 comprises a foot 26 and a head 28. The foot 26 is interposed between the head and the base 10 with reference to the radial direction. The head 28 defines the top face 14. The head 28 on its face facing towards the axis 6 has a flat-bottomed cavity 30 accommodating the strip 20 so that the head straddles the strip. The cavity also houses the foot 26 such that the strip is sandwiched between the head and the foot, interposed between these in the radial direction.

Each element comprises a fixing member such as, in this particular instance, a screw 32 the shank of which passes in the radial direction through an orifice in the foot 26, an orifice 34 in the strip and an orifice in the head 28. The screw is screwed into the threaded orifice of the head to fix the foot rigidly to the head and to the portion of strip interposed between this foot and head. The head of the screw rests against the foot.

The strip 20 thus has, along the strip, a succession of orifices 34 in the successive portions of the strip to which the elements 12 of the series are fixed. The elements 12 are therefore firmly attached to one another by the strip 20. These portions each extend from one of the longitudinal edges of the strip to the other and at a distance from at least one of its axial ends, and at a distance from both ends in the case of most of the portions.

The number of elements 12 in the series is, in this particular instance, an odd number. In the present invention, for example, the element 12 situated in the middle of the series is fixed rigidly to the base 10 as illustrated notably in FIG. 12. To that end, the base comprises two posts 36 the free ends of which are rigidly fixed to the foot 26 of the corresponding element 12, in this instance by means of screws 38 extending respectively through the posts and the foot 26 parallel to the direction of the axis 6.

As in the other elements 12, a portion of the strip 20 is rigidly fixed to this element. This is a portion situated at equal distances from the longitudinal ends of the strip. The strip is therefore rigidly fixed to the base 10 by a central portion of the strip and only by this portion.

The cam 22 is illustrated notably in FIGS. 4, 5, 7 to 9 and 12 to 19 and in FIGS. 20 to 24 but in a variant embodiment. It has an elongate shape with a longitudinal axis 42 parallel to the axis 6. The cam is housed in the member 8 running parallel to the base 10 and to the series of elements 12 and interposed in the radial direction between the base and the series of elements as illustrated notably in FIGS. 12 to 14. The cam 22 has two cylindrical longitudinal end portions 44 housed in respective bearings 46 of the base such that the cam is mounted with the ability to rotate on the base about its axis 42.

The return members 24 are designed to return the elements 12, except for the abovementioned middle element, towards the axis 6 and therefore into contact with that part of the cam that extends facing the elements. It is therefore that part which defines the position of each element 12 in the radial direction.

To that end, the cam 22 has a number of lobe surfaces, in this instance four in the cam of FIGS. 4, 5, 7 to 9 and 12 to 19, and five, numbered 50, 52, 54, 56 and 58, in the cam that constitutes the variant in FIGS. 20 to 24. In FIGS. 20 to 24, the five respective positions of the cam are the image of one another through a rotation by one fifth of a revolution about the axis 42.

Each lobe surface is defined by one or more faces following on from one another along the cam. The internal face of the foot 26 of each element is planar and locally parallel to the top face 14 thereof. The profile of each lobe surface in the radial plane, when this lobe surface extends as far as the top of the cam and thus constitutes the active lobe, confers a similar profile to the bearing face formed by the collaboration of the tops 14 of the elements 12 as illustrated notably in FIG. 8.

In this example, one, 50, of the lobe surfaces is intended to position all the tops 14 at the same radial distance so as to give the support a cylindrical overall shape. To do that, the lobe surface 50 is defined by a plane face parallel to the axis 6. All the other lobe surfaces 52 to 58 have a curved shape, namely a generally curved convex shape. This curvature corresponds to the profile of the lobe surface in question in a plane radial to the axis 42, i.e., in a plane radial to the axis 6 when the lobe surface is active.

The lobe surface 50 is defined by a single plane face. The lobe surface 58 is defined by a single curved face. The lobe surface 56 is defined by two curved end faces and a plane middle face. The lobe surface 54 is defined like the lobe surface 58, but with a more pronounced curvature. In this example, some of the lobe surfaces have a plane face which increases in size with increasing distance from the longitudinal axis of the cam.

The return members 24 are provided in pairs so that each element 12 is returned by two dedicated members situated one on each side of the base 10. There are therefore twice as many members 24 as there are elements 12, remembering that the central element 12 is not able to move relative to the base.

Figure 10:
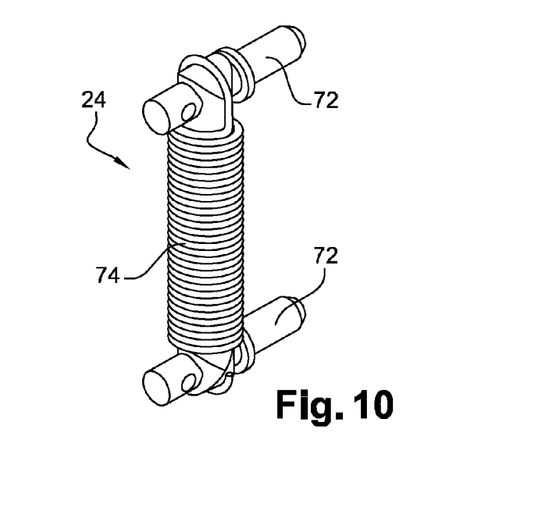
FIGS. 10 and 11 are views of one of the return members of the member of FIG. 7 respectively in perspective and in vertical section.
Figure 11:
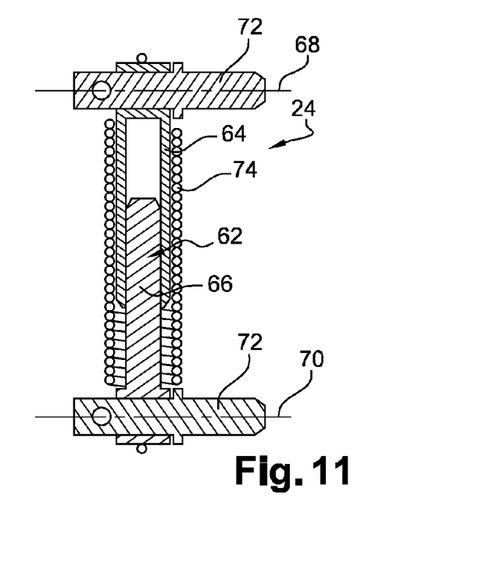
Figure 12:
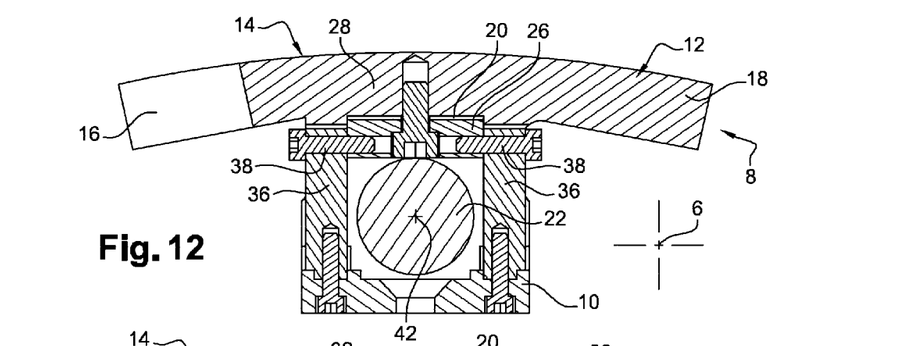
FIGS. 12 to 14 are views of the member of FIG. 7 in cross section on the planes XII-XII, XIII-XIII and XIV-XIV.
Figure 13:
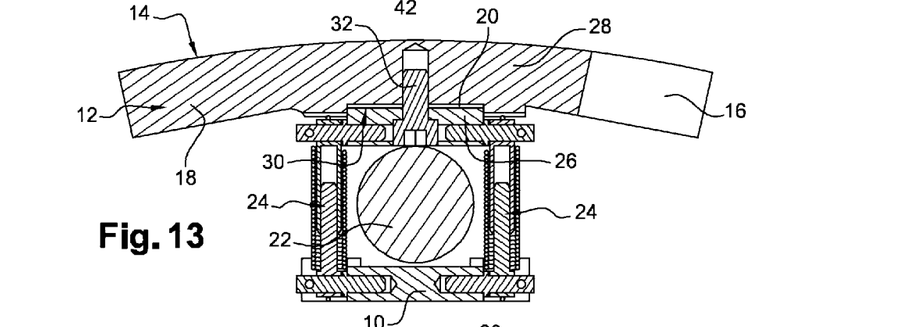
Figure 14:
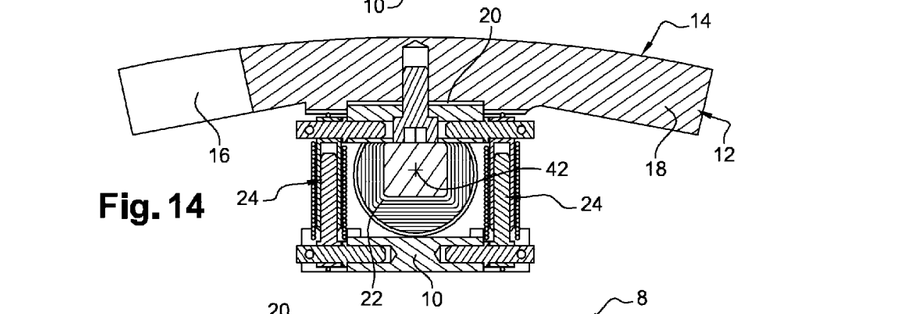
Figure 15:
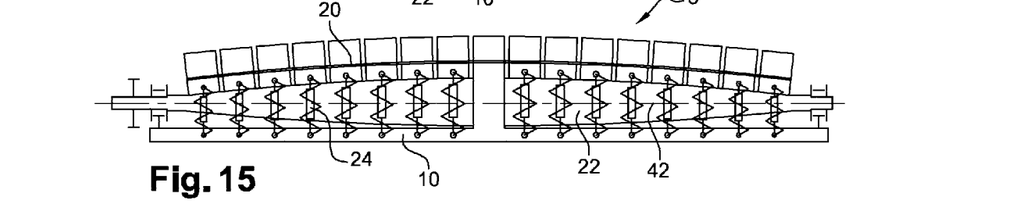
FIGS. 15 to 18 are views similar to FIGS. 7 and 12 to 14, illustrating the kinematic connections between the components.
Figures 16, 17, 18:
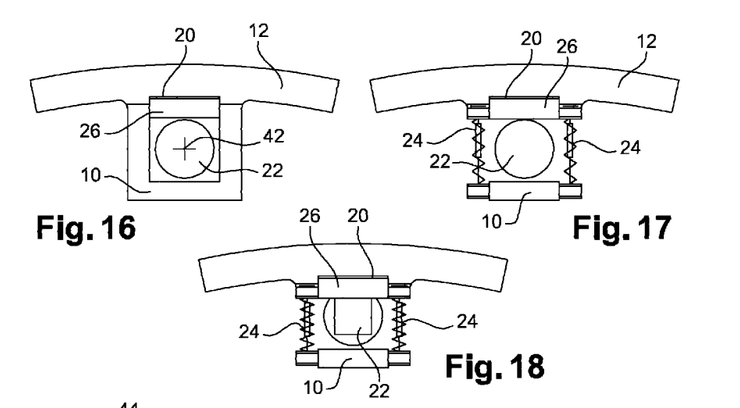
Figure 19:
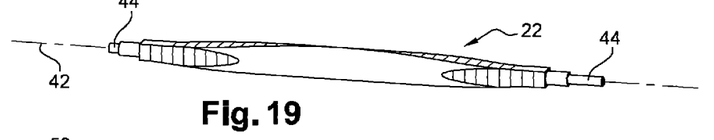
FIG. 19 is a perspective view of the cam of the member of FIG. 8.
Figures 20, 21:
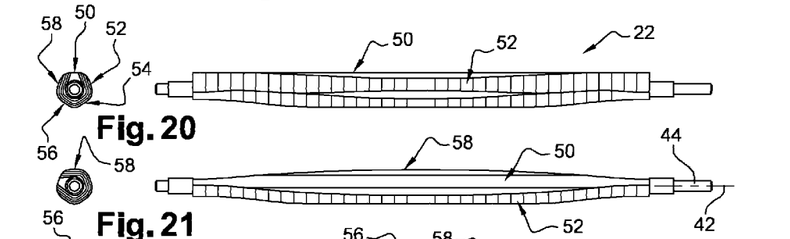
FIGS. 20 to 24 each show an end view and an elevation view of the cam of FIG. 19 in an embodiment variant and in cam positions which differ from one another through rotation of the cam about its axis.
Figures 22, 23, 24:
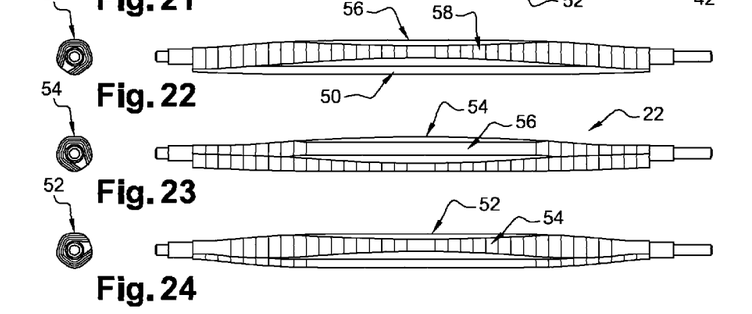
Figure 25:
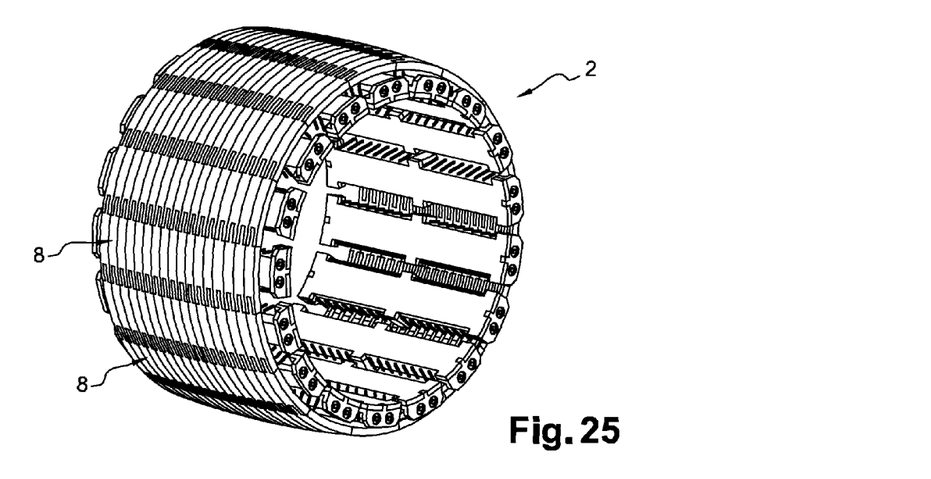
FIGS. 25 to 28 are views analogous to FIGS. 1, 3, 14 and 18 respectively, showing a second embodiment of the support according to the invention.
Figure 26:
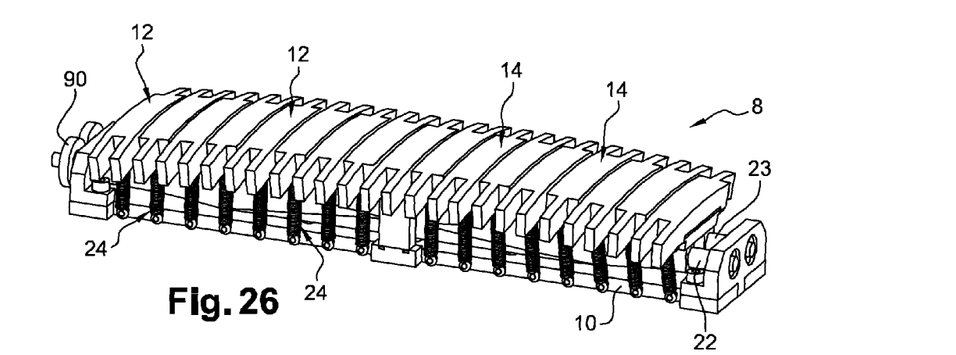
Figure 27:
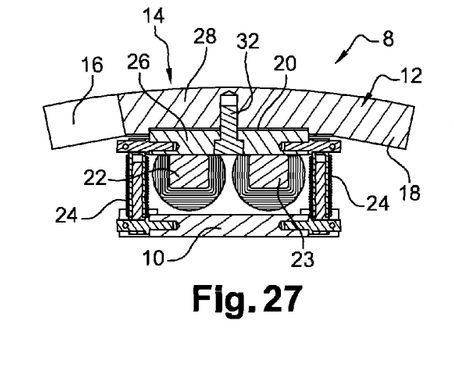
Figure 28:
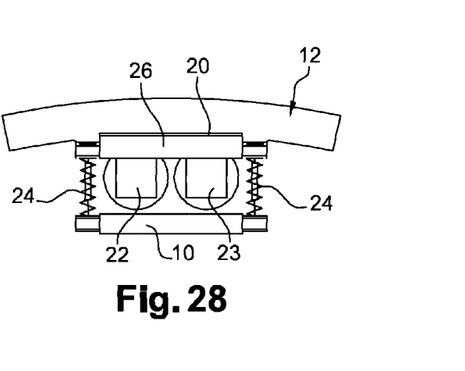

The return members are all identical. As illustrated in FIGS. 10 and 11, each member 24 comprises a telescopic skeleton 62 in this instance comprising a tube 64 and a slider 66 mounted with the ability to slide inside the tube in a radial direction. The tube and the slider are in contact with one another via cylindrical faces of circular cross section in a plane perpendicular to the direction of sliding. One of the two elements of the skeleton, in this instance the tube, is fixed by one end to the foot 26 of the element, here by means of a pivot connection pivoting about an axis 68 parallel to the strip and perpendicular to the longitudinal direction thereof. At the same time the other element of the skeleton, in this instance the slider 66, is connected by a pivot connection to the base 10 about an axis 70 parallel to the axis 68. Each pivot connection is embodied here by a shaft 72 passing through the relevant element of the skeleton and through the foot or the base.

Each return member 24 further comprises a helical torsion spring 74 which in this instance is slipped concentrically over the skeleton, the longitudinal ends of the spring being fixed rigidly to the respective distal ends of the tube and of the slider. The spring is designed so that it tends to cause the two shafts 72 to move closer together, and therefore tends to move the foot 26 closer to the base 10.

With this arrangement, the two members 24 therefore tend to keep each member 12 in contact with the active lobe surface of the cam which imparts its shape to the top of the member 8. Provision may be made for the support to comprise a drive system for turning the baseplate, the members 8 and the green tyre blank at a speed less than or equal to a predetermined maximum limit. The members 24 are designed, particularly through the choice of the spring stiffness of the spring 74, to be able to keep the element 12 in contact with the cam against the action of any bending strain applied by the strip 20 to the element which would have a tendency to move it away from the axis 6 and also against the action of the centrifugal force generated by the rotation of the support.

FIGS. 15 to 18 illustrate the kinematic connections between the components following from the preceding description. As illustrated notably in FIGS. 12 and 13, in order to reduce the risks of statically indeterminate assembly, the cam is not in contact with the base over the entire length of the cam.

In order to alter the shape of the bearing surface defined by the tops 14, all that is required is for the cam 22 to be rotated about its axis 42 so as to change the lobe surface with which the elements are in contact and which defines the radial position of such elements. The cam illustrated in FIGS. 1 to 19 therefore offers four possible positions while the cam illustrated in FIGS. 20 to 24 offers five, namely a position in which the support forms a cylindrical bearing surface and four positions in which it offers a curved bearing surface, the part of the surface that is distant from the axial ends being domed. It is therefore the same cam that is able to form different bearing surfaces with the member 8.

A gearing mechanism joining all the cams 22 of the respective members together may be provided so that all the cams can be rotated simultaneously to switch from one surface shape to another.

In each position, including the position in which the surface is curved, the elements 12 with their successive tops 14 form a surface which has no protruding edge and therefore no stepped configuration.

The lobe surfaces are in this particular instance defined in such a way that each element comes into contact with the active lobe surface of the cam at at least three points which are not aligned with one another, and do so whatever lobe surface is being used. A plane via which each element bears against the cam is thus defined. In this particular instance, surface-to-surface contact between a portion of the lobe surface of the cam and the internal face of the foot 26 is even provided. This arrangement ensures that the element adopts a precise and stable position on the cam.

Figure 7:
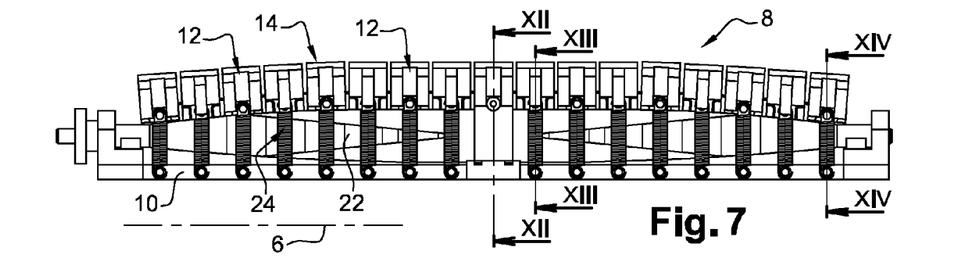
FIGS. 7 and 8 are two views of the member of FIG. 3, respectively from the side and in longitudinal section.
Figure 8:
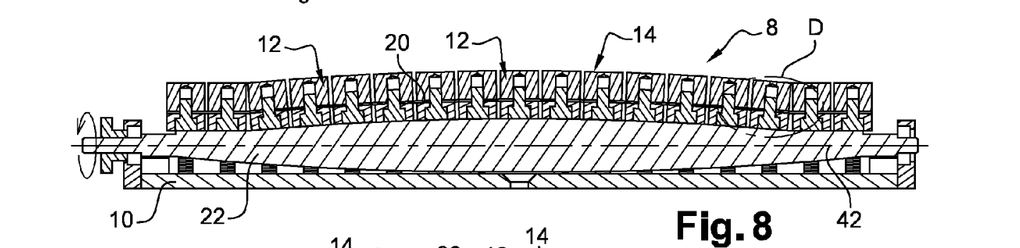

It can be seen, for example in FIGS. 7 and 8, that some of the elements 12 do not have their tops 14 parallel to the axis 6. This is because the lobe surface against which these elements are resting is not itself parallel to this axis. Any inclination of the top 14 with respect to the axis 6 is permitted firstly by the flexibility of the strip 20 which keeps the elements 12 attached to one another while at the same time allowing them to tilt relative to one another about an axis parallel to the axes 68 and 70, and also by the pivot connections of the return means which perform this return without preventing potential tipping of the element with respect to the base about these axes.

Figure 9:
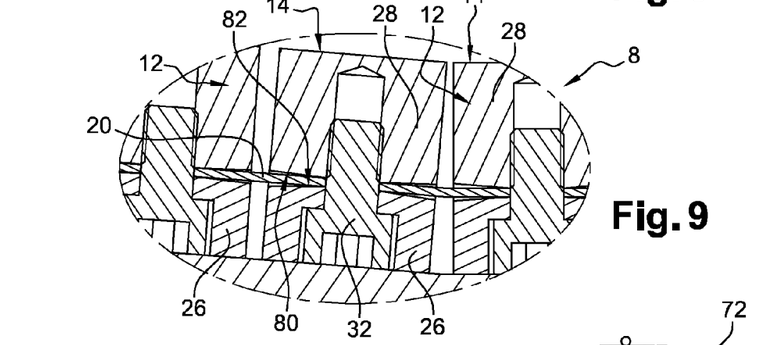
FIG. 9 is a view of part D of the member of FIG. 8, on a larger scale.

Furthermore, as illustrated in FIG. 9, the internal faces 80 and 82 of the head 28 and of the foot 26 which extend facing the strip have a convex curved shape in each zone of these faces extending from the screw 32 to the front face or rear face of the element. The faces 80 and 82 therefore have a shape which causes them to diverge from the strip beyond the screw when the strip is in a planar configuration. The height of the interposition zone accommodating the strip will therefore increase with increasing distance away from the screw 32. This then offers a further possibility for excursion to the element 12 making it even easier for it to position itself against the lobe surface of the cam.

FIGS. 25 to 28 illustrate a second embodiment of the support according to the invention.

In general principle, this support is identical to the previous one except that each member 8 bears not just one single cam 22 but two cams 22 and 23 positioned side by side and interposed between the base and the elements 12 in place of the single cam of the previous embodiment. The base and the elements have been widened in the circumferential direction to allow them to accommodate the two cams. As before, each of the cams is mounted with the ability to rotate on the base and has several lobe surfaces following on from one another around the periphery of the cam. The cams are placed side by side with their ends coinciding and their longitudinal axes parallel. As before, each cam defines with the active lobe surface, namely the one furthest from the axis 6, a bearing face for the elements 12. In this particular instance, each element bears simultaneously against the two cams, the left-hand part of the element bearing against one of the cams while the right-hand part thereof bears against the other. Here, each of the cams has four lobe surfaces evenly distributed about the axis of the cam and separated from one another by a quarter of a revolution. To change the active lobe surface, all that is required is for the cam to be rotated by one quarter of a turn about its axis.

In this particular instance, the rotations of the two cams can be rendered dependent on one another, for example using a belt and pulley system, so that rotating one of the cams causes the other to rotate and vice versa. The active lobe surface of the two cams is therefore changed simultaneously.

In these two embodiments it may be seen that each member comprises a composite device combining the flexibility of the thin strip with the rigidity of the solid component that forms the foot of each element, and that the deformation permitted by this device is similar to that of a spinal column.

Because the various lobe surfaces are distributed at different azimuths on the cam, to machine this cam the starting point may be a blank of cylindrical shape of circular cross section. A first of the lobe surfaces is machined, for example by rolling along the cam, at a certain azimuth. Next, the cam is turned to the next azimuth and the corresponding lobe surface is machined again by rolling. This procedure is followed a number of times until all the lobe surfaces have been produced.

It is the central element 12 which imparts the maximum altitude to the curved shape of the support, its neighbours being associated with the highest points of the corresponding lobe surface on the cam. It is the only one not to press against the cam and the position of which is invariable irrespective of the shape given to the support. In addition, the greater the distance from this central element, the larger surface area the relevant element has for contact with the active lobe surface of the cam, provided that this lobe surface is curved.

The return members 24 have the notable objective of compensating for the stiffness of the strip. The two pivot connections provide two degrees of freedom of movement for the element with respect to the base. The members 24 provided with their skeleton give the elements 12 stability by preventing them from tilting under external influence and guaranteeing the correct positioning thereof.

The flexible metal strip also contributes to the stability of the system. The more it is bent, the more rigid it is in torsion. Only in the presence of the flat lobe surface is it not bent thus making little or no contribution towards the torsional rigidity of the system.

The version of the invention that combines a single cam with each member has the advantage of saving weight. The multiple-cam version is advantageous when laying products involving heavy loadings. It is admittedly heavier and therefore creates a greater centrifugal force as the support rotates, but it allows each shaping element to have two bearing points on the cams. This gives the support greater stability.

The invention does not introduce any limit as to the shape of surface that can be generated with the support. Indeed, all that is required is the creation, for each member, of at least one cam having the corresponding shape so that the desired shape can be obtained on the support that holds the green tyre blank that is in the process of being built.

The support according to the invention is used for building a green tyre blank. This green tyre blank is built by assembling several raw rubber components such as plies on one another and joining them together. The rubber contains a mixture of synthetic elastomer, natural elastomer, additives and oil. The assembly may also use reinforcing components made of metal or of textile.

When the method of the invention is being used to produce the green tyre blank, the procedure here is as follows:

it is assumed for example that the external bearing face of the support 2 is initially in a cylindrical shape;

several rubber plies are laid on this face and the plies are welded together;

next, the cam or cams of each member is or are moved from the position in which the active lobe surface is flat into a position in which the active lobe surface is curved, so as to give the bearing face of the support 2 a curved shape. That has the effect of deforming the green tyre blank that is in the process of being built;

the building of the tyre is continued on the support that now has this geometry, for example by adding to the green tyre blank other rubber elements that are then fixed to the previous ones.

Similarly, the shape of the support 2 can be altered a further one or more times, depending on the green-blank-building requirements.

In a later stage, the green tyre blank is then cured to vulcanize the rubber in order to obtain the tyre.

If there is a desire not to generate tension in the green tyre blank when switching from a flat active lobe surface to a curved active lobe surface, the flat lobe surface needs to be the one at the greatest distance from the axis of the cam. The curved lobe surfaces will therefore be produced with radial dimensions smaller than those of the flat lobe surface. If, on the other hand, a small amount of tension is to be generated in the middle of the green tyre blank, the flat lobe surface needs merely be lowered a little with respect to the highest point of at least one of the curved lobe surfaces.

The support according to the invention can also be used for building green tyre blanks of different shapes intended to form tyres of different models.

Another advantage of the invention is that it requires no setup operation after the shape of the support face has been changed by rotating the cams.

Of course, numerous modifications may be made to the invention without departing from the scope thereof.

The concepts whereby, on the one hand, there is a flexible strip by means of which the elements are joined together, and, on the other hand, there is a cam able to occupy any one of at least two positions which are the image of one another by rotation, the cam defining element positions with respect to the base and such that, in the case of at least some of the elements, the element positions associated with the respective positions of the cam differ from one another, may be employed independently of one another.

It can be anticipated that the cams used are of the type of those disclosed in the aforementioned document FR-2 939 711.

The invention claimed is:

1. A support for assembling a green tyre blank, the support comprising:
   a baseplate with symmetry of revolution; and
   a plurality of members fixed to the baseplate, the baseplate arranged to modify a distance of each member from a main axis of rotation of the support,
   wherein each member of the plurality of members includes:
   a rigid base,
   external elements each including a rigid portion, mounted to be movable relative to one another and forming a row along the base in a direction parallel to the main axis of rotation of the support, and
   a single flexible strip attached to the external elements of the member and positioned radially under the rigid portion of the external elements, such that the external elements of the member are attached to one another via the strip,
   wherein the external elements each include a top portion having a curved shape, such that the top portions of the external elements form a bearing surface that is continuous along an entire circumference of the baseplate, so that, in any radial plane that includes the main axis of rotation of the support, the top portions of the external elements of one or two of the members form a part the bearing surface extending from one axial end edge of the bearing surface to an opposite axial end edge of the bearing surface along the radial plane, for supporting the green tyre blank during assembly.

2. The support according to claim 1, wherein, for a member of the plurality of members, the strip is rigidly fixed to the base of a member only at a portion of a length of the strip.

3. The support according to claim 2, wherein the portion is situated at equal distances from two longitudinal ends of the strip.

4. The support according to claim 1, wherein the strip is non-extensile.

5. The support according to claim 1, wherein, for each member of the plurality of members, the strip extends at a distance from an internal face of each of the external elements of the member.

6. The support according to claim 1, wherein, for each member of the plurality of members, the strip of the member is interposed, in a direction radial to the main axis of rotation of the support, between two portions of each of the external elements of the member, respectively.

7. The support according to claim 6, wherein, for each of the external elements of the member, at least one of the two portions has, facing the strip, a face configured to allow the external element a degree of travel with respect to the strip about an axis locally parallel to the strip and perpendicular to a longitudinal direction of the strip.

8. The support according to claim 1, wherein each member of the plurality of members includes, for each external element of the member, at least one return member that returns the external element towards the base of the member.

9. The support according to claim 8, wherein each return member of the at least one return member is mounted to be rotatable with respect to an external element of the member or the base of the member, or both the external element and the base, about an axis perpendicular to the main axis of rotation of the support.

10. The support according to claim 8, wherein each return member of the at least one return member is mounted to be rotatable with respect to the external element of the member and the base of the member about axes that are perpendicular to the main axis of rotation of the support.

11. The support according to claim 8, wherein each return member of the at least one return member includes a non-elastic telescopic skeleton.

12. The support according to claim 8, further comprising a driver arranged to rotate the baseplate at a speed lower than a predetermined maximum speed, wherein each return member of the at least one return member returns the external element towards the base of the member when the baseplate is rotating at the predetermined maximum speed.

13. The support according to claim 1, wherein each member of the plurality of members includes at least one cam able to occupy any one of at least two positions through rotation, and wherein positions of each cam of the at least one cam defines element positions with respect to the base of the member such that, for at least some of the external elements of the member, the element positions associated with the respective positions of each cam of the at least one cam differ from one another.

* * * * *

UNITED STATES PATENT AND TRADEMARK OFFICE
CERTIFICATE OF CORRECTION

| | | |
|---|---|---|
| PATENT NO. | : 9,902,122 B2 | Page 1 of 1 |
| APPLICATION NO. | : 13/995677 | |
| DATED | : February 27, 2018 | |
| INVENTOR(S) | : Cédric Astier | |

It is certified that error appears in the above-identified patent and that said Letters Patent is hereby corrected as shown below:

In the Claims

Column 10
Line 44, "a part" should read --a part of--.

Signed and Sealed this
Fifteenth Day of May, 2018

Andrei Iancu
*Director of the United States Patent and Trademark Office*